(12) United States Patent
Wang et al.

(10) Patent No.: US 7,036,938 B2
(45) Date of Patent: May 2, 2006

(54) PEN PROJECTION DISPLAY

(75) Inventors: Jian Wang, Beijing (CN); Chunhui Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 10/284,470

(22) Filed: Oct. 31, 2002

(65) Prior Publication Data

US 2004/0085523 A1 May 6, 2004

(51) Int. Cl.
*G03B 21/14* (2006.01)

(52) U.S. Cl. .......................................... 353/46
(58) Field of Classification Search .................... 353/42, 353/46, 48, 49, 122; 362/559, 579; 359/213; 345/179, 180, 182; 385/901
See application file for complete search history.

(56) References Cited

U.S. PATENT DOCUMENTS

| | | | | |
|---|---|---|---|---|
| 5,032,924 A | * | 7/1991 | Brown et al. ................ | 348/759 |
| 5,196,875 A | * | 3/1993 | Stuckler ....................... | 353/97 |
| 5,398,082 A | * | 3/1995 | Henderson et al. .......... | 348/781 |
| 5,727,098 A | | 3/1998 | Jacobson | |
| 6,254,253 B1 | | 7/2001 | Daum et al. | |
| 6,294,775 B1 | | 9/2001 | Seibel et al. | |
| 6,585,154 B1 | | 7/2003 | Ostrover et al. | |
| 6,655,597 B1 | * | 12/2003 | Swartz et al. ........... | 235/462.45 |
| 2002/0064341 A1 | | 5/2002 | Smithwick et al. | |
| 2002/0125324 A1 | * | 9/2002 | Yavid et al. ............ | 235/462.45 |
| 2002/0180869 A1 | * | 12/2002 | Callison et al. .............. | 348/203 |

\* cited by examiner

*Primary Examiner*—William C. Dowling
(74) *Attorney, Agent, or Firm*—Banner & Witcoff, Ltd.

(57) ABSTRACT

The projection display includes a light projector unit for generating and projecting light, an oscillator unit for oscillating light projected from the light projector unit, and a frequency generation and modulation unit. The frequency generation and modulation unit drives the oscillator unit and modulates the light projected by the light projector unit. In turn, the oscillator unit oscillates the light projected by the light projector unit in two dimensions, so that the projected light scans an incident surface in a raster pattern. At the same time, the frequency generation and modulation unit modulates the light produced by the light projector unit in synchronization with the scanning process and image data supplied so that the projected light produces images corresponding to the image data over a scanned area.

113 Claims, 4 Drawing Sheets

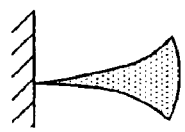
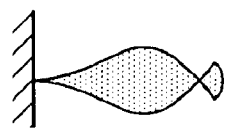
FIG. 2A          FIG. 2B
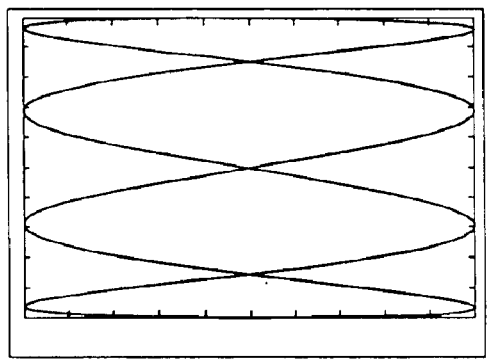
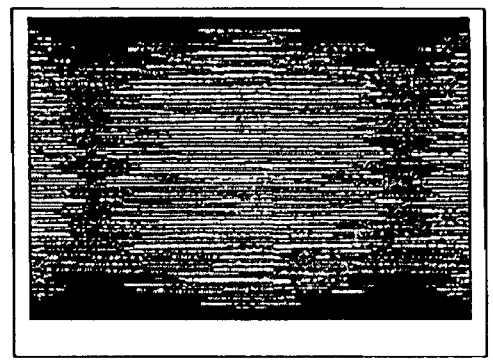
FIG. 3A          FIG. 3B
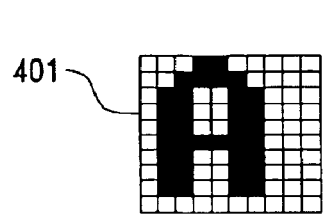
FIG. 4A ⎫ 403
[0011110000] ⎬
[0110011000] ⎭
[0110011000]
[0110011000]
… … … …
[0000000000]
FIG. 4B

PEN PROJECTION DISPLAY

FIELD OF THE INVENTION

The present invention relates to a projection display. The invention has particular application to a projection display that can be incorporated into a hand-held writing device, such as an ink pen or computer stylus.

BACKGROUND OF THE INVENTION

Computers have become ubiquitous in our society, and are used in very facet of daily life. While modern computers can provide information to a user audibly, the primary mode of conveying information for most computers is visual. That is, most computers will display information to a user visually on a monitor, such as a cathode ray tube monitor, a liquid crystal display monitor, or a plasma monitor. Accordingly, while the processing and memory components of a computer can be made very small, further reduction in the size of conventional computers is practically limited by the need to have a visible display monitor. Accordingly, there is a need for a small display monitor that can comfortably display information provided by a computer, but which does not occupy a large fixed area.

SUMMARY OF THE INVENTION

Advantageously, the invention is directed to a projection display that can display images, such as images corresponding to image information from a computer, onto an incident surface. While the images displayed by a projection display according to the invention can be sufficiently large to be easily read, the components of the projection display can be made small enough to fit inside of a handheld writing instrument, such as an ink pen or stylus for a digital tablet.

With a projection display according to the invention, an oscillator oscillates light projected by a light projector. More particularly, the oscillator simultaneously oscillates the projected light in a first direction and a second direction orthogonal to the first direction. For example, the oscillator may simultaneously oscillate the projected light in both an X-direction and a Y-direction. In this manner, the light produced by the light projector will scan an incident surface in a raster pattern. At the same time, the projected light is modulated in synchronization with the raster scanning process based upon image data. Thus, the projected light is modulated and oscillated so that it produces images corresponding to the image data over a scanned area.

BRIEF DESCRIPTION OF THE DRAWINGS

The foregoing summary of the invention, as well as the following detailed description of preferred embodiments, will be better understood when read in conjunction with the accompanying drawings.

FIGS. 2A and 2B illustrate the movement of an optical fiber in different modes of oscillation.

FIGS. 3A and 3B illustrate the projection resolution obtained from different ratios of the line scanning direction oscillation frequency to the refresh oscillation frequency.

FIGS. 4A and 4B illustrate how pixel information can be converted into binary image data.

DETAILED DESCRIPTION OF PREFERRED EMBODIMENTS

Overview

Figure 1:
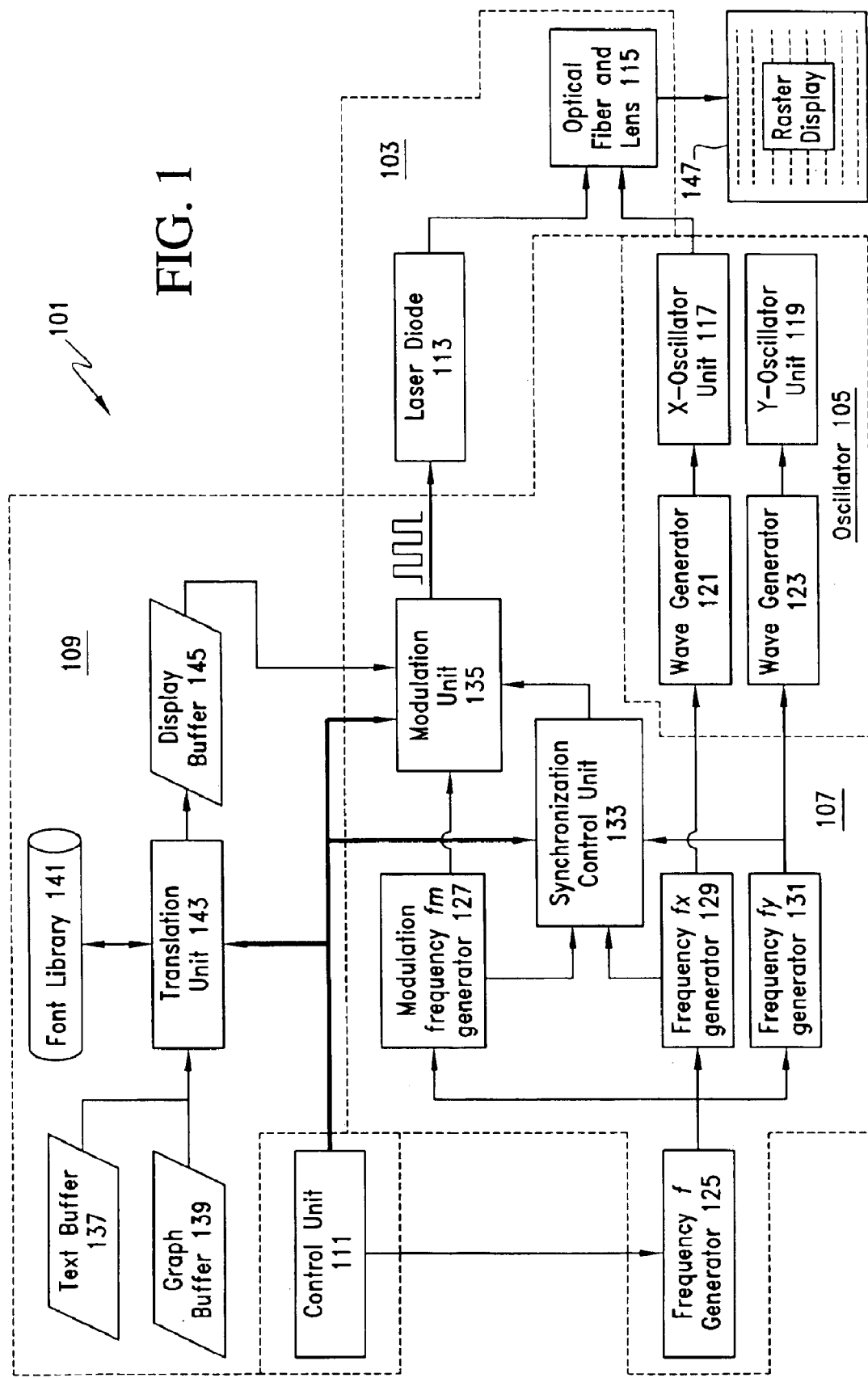
FIG. 1 shows a schematic diagram of a projection display according to various embodiments of the invention.

FIG. 1 illustrates a projection display 101 according to one embodiment of the invention. As seen in this figure, the projection display 101 includes a light projector unit 103 for generating and projecting light, an oscillator unit 105 for oscillating light projected from the light projector unit 103, and a frequency generation and modulation unit 107. The projection display 101 also includes an image data input unit 109 and a control unit 111. As will be explained in detail below, the frequency generation and modulation unit 107 drives the oscillator unit 105 and modulates the light projected by the light projector unit 103. In turn, the oscillator unit 105 oscillates the light projected by the light projector unit 103 in two dimensions.

More particularly, the oscillator unit 105 oscillates the light produced by the light projector unit 103 so that the projected light scans an incident surface in a raster pattern. At the same time, the frequency generation and modulation unit 107 modulates the light produced by the light projector unit 103 in synchronization with the scanning process and image data supplied by the image data input unit 109. In this manner, the projected light is modulated and oscillated so that it produces images corresponding to the image data over a scanned area. The control unit 111 then controls the operation of the frequency generation and modulation unit 107 and the image data input unit 109.

The Light Projector Unit

As seen in FIG. 1, the light projector unit 103 includes a light source 113 that generates light and a light transmission device 115 for transmitting the light from the light source 113. As will be explained in detail below, the light projected from the light source 113 is modulated to form individual pixels as it is scanned over an incident surface, such as a blank piece of paper, a whiteboard or even a desktop. Thus, a light source 113 that projects light in a narrow, focused beam provides a higher display resolution than a light source 113 that projects light in a wider, more dispersed beam. Accordingly, with the illustrated embodiment of the invention, the light source 113 is a laser diode having a central wavelength of approximately 650 nm. As will be appreciated by those of ordinary skill in the art, a laser diode advantageously projects a focused and coherent beam of light, which allows the projection display 101 to display individual pixels with a high resolution.

Figure 5:
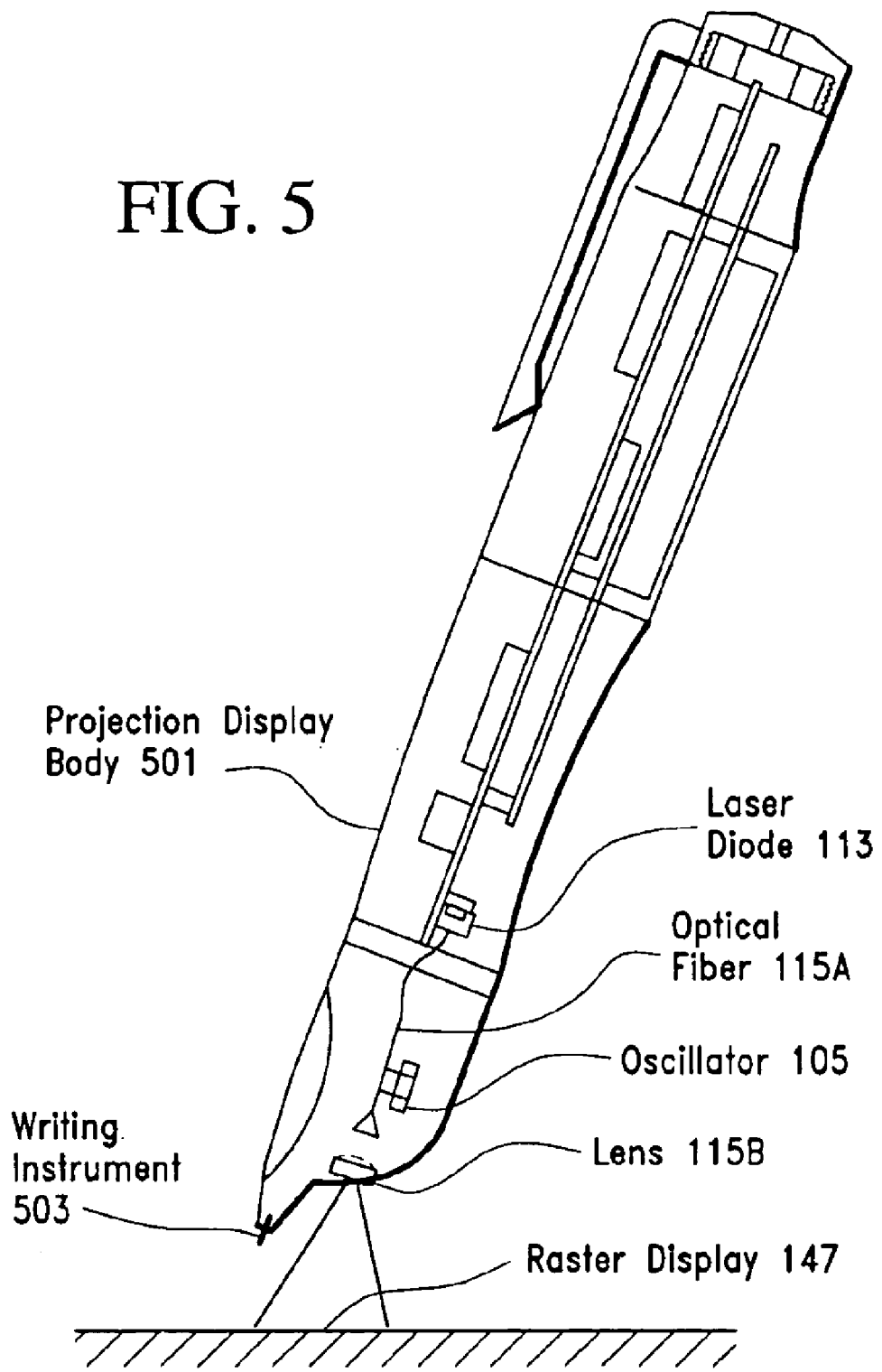
FIG. 5 illustrates a pen projection display according to an embodiment of the invention.

As seen in FIG. 5, the light transmission device 115 for the illustrated embodiment is a combination of an optical fiber 115A and lens 115B. The optical fiber 115A projects the light emitted from the laser diode 113 in the direction to which the optical fiber 115A is bent. That is, the optical fiber 115A allows the light emitted from the laser diode 113 to be projected in a variety of directions, without the orientation of the laser diode 113 itself actually moving. Instead, by simply bending the optical fiber 115A to point in a specific direction, the light emitted from light diode 113 will be projected in that direction. The lens 115B then maintains the narrowness of the beam of projected light transmitted by the optical fiber 115A. With the illustrated embodiment, the optical fiber 115A has a length of approximately 12 mm. As will be discussed in detail below, however, the length of the optical fiber 115A may vary depending upon the frequency at which the optical fiber 115A is to be oscillated.

It should also be noted that, with alternate embodiments of the invention, the light source 113 may be implemented using other types of structures. For example, the light source 113 may be implemented using a laser diode providing light at any suitable visible wavelength, or at multiple wavelengths. The light source 113 also may be implemented using another type of coherent light generating device, such as a gas laser or a solid-state laser. The light source 113 may even be implemented using a non-coherent light device, such as a conventional incandescent light, a fluorescent light, or a light-emitting diode (LED). As will be appreciated from the discussion of the operation of the invention above, the light source 113 need only be able to product a sufficiently narrow beam of light so as to be able to project individual pixels with a desired resolution at a desired distance.

Similarly, the light transmission device 115 may also be implemented using alternate structures. For example, with some embodiments of the invention, the light transmission device 115 may be implemented using one or more lenses, and omit any use of an optical fiber 115A. The light transmission device 115 may even be omitted altogether. For example, as will be discussed in detail below, some embodiments of the invention may oscillate the light source 113 directly, rather than oscillating a light transmission device 115. With these embodiments, the light transmission device 115 may be unnecessary, and thus not provided with these embodiments of the invention.

If the projection display 101 is constructed in a portable configuration, the light from the light source 113 may be inadvertently projected into the eyes of a user or someone standing close to the user. Accordingly, the light source 113 may beneficially be implemented with a low-power source producing light that can be safely viewed by the human eye. For example, in the illustrated embodiment, the laser diode 113 projects light in the 650 nm wavelength, and has an operating current of less than 20 mA. After its projected light is transmitted by the optical fiber 115A and lens 115B, the output power of the projected light is approximately 1 mW. Of course, other low-power configurations can alternately be employed that will project light safe for the human eye.

The Oscillator Unit

Turning now to the oscillator unit 105, the oscillator unit includes an X-direction oscillator 117 and a Y-direction oscillator 119. A wave generator 121 then produces a wave signal to drive the X-direction oscillator 117, while a wave generator 123 produces another wave signal to drive the Y-direction oscillator 119. The X-direction oscillator 117 is connected to the optical fiber 115A of the light transmission device 115 so that, when the X-direction oscillator 117 is activated, it oscillates the optical fiber 115A in the X-direction at a frequency corresponding to the signal wave provided by the wave generator 121. Similarly, the Y-direction oscillator 119 is connected to the optical fiber 115A of the light transmission device 115 so that, when the Y-direction oscillator 119 is operated, it oscillates the optical fiber 115A in the Y-direction at a frequency corresponding to the signal wave provided by the wave generator 123. Thus, when the X-direction oscillator 117 and the Y-direction oscillator 119 operate simultaneously, the optical fiber 115A of the light transmission device 115 oscillates in both the X-direction and the Y-direction at the same time.

By oscillating the optical fiber 115A in both the Y-direction and the X-direction simultaneously but at substantially different frequencies, the light transmitted by the optical fiber 115A will form a raster scan pattern on an incident surface. That is, if the optical fiber 115A is oscillated in one direction substantially faster than it is oscillated in the orthogonal direction, then the light transmitted by the optical fiber 115A will raster scan a surface onto which the light is projected. For example, if the optical fiber 115A is oscillated in the X-direction at a rate that is 100 times the rate at which the optical fiber 115A oscillates in the Y-direction, then the light transmitted by the optical fiber 115A will project approximately 50 parallel horizontal lines into an incident surface for each half-oscillation it makes in the Y-direction. Similarly, if the optical fiber 115A oscillates in the Y-direction at a rate that is 100 times the rate at which it oscillates in the X-direction, then the light transmitted by the optical fiber 115A will project approximately 50 parallel vertical lines for each half-oscillation of the optical fiber 115A in the X-direction.

In the illustrated embodiment, both the X-direction oscillator 117 and the Y-direction oscillator 119 are ceramic piezoelectric oscillators. As well known to those of ordinary skill in the art, piezoelectric oscillators oscillate in proportion to the variation in an applied voltage. In the illustrated embodiment, a signal wave produced by the wave generator 121 drives the operation of the X-direction oscillator 117. Similarly, a signal wave produced by the wave generator 123 drives the operation of the Y-direction oscillator 119. The signal waves from the wave generators 121 and 123 may be sinusoidal waves, triangular waves, or waves of any other suitable type of waveform. The frequency of the signal waves from the wave generators 121 and 123 in turn correspond to frequency signals provided by the frequency generation and modulation unit 107. With alternate embodiments of the invention, the X-direction oscillator 117 and the Y-direction oscillator 119 can be implemented using a single piezoelectric oscillator, such as a ceramic piezoelectric oscillator, that oscillates in both the X-direction and the Y-direction. Still further, non-piezoelectric oscillators may also be used to oscillate the light projected from the light source 113. For example, induction motors or other types of oscillating motors can be used to oscillate the light projected from the light source 113. Also, while the oscillator 107 oscillates the optical fiber 115A in the illustrated embodiments, the light source 113 itself or the overall light projector unit 103 may be directly oscillated with alternate embodiments of the invention. For example, the alternate embodiments of the invention may employ a rigid light transmission device 115 or omit a light transmission device 115 altogether. With these embodiments, the light source 113 may be directly moved in order to oscillate the projected light. One example of such an embodiment of the invention will be described in detail below.

It should also be noted that the terms "X-direction" and "Y-direction" used herein do not refer to specific directions, but instead are used simply to refer to the orientation of a first direction relative to a second direction. As will be appreciated by those of ordinary skill in the art, a scanning operation can be performed by simultaneously moving the projected light in any first direction and a second orthogonal to the first direction. For example, the projected light can even be oscillated by rotating the light projector 103 about an axis, while simultaneously oscillating the light projector 103 (that is, the light source 113, the transmission device 115, or both) toward and away from that axis. With these embodiments, the projected light will scan an incident surface in a pattern based upon polar coordinates, rather than upon Cartesian coordinates as with those embodiments of the invention that scan in an X-direction and a Y-direction.

The Frequency Generation and Modulation Unit

As seen in FIG. 1, the frequency generation and modulation unit 107 includes a frequency generator 125 that generates a base signal with a frequency f. A modulation frequency generator 127 then multiplies the frequency f of the base signal by a value m to produce a modulation signal with a modulation frequency fm. As will be discussed in more detail below, the modulation frequency fm determines how many pixels occur in each line scanned by the projected light from the light projector unit 103. Likewise, an X-oscillation frequency generator 129 multiplies the frequency f of the base signal by a value x to produce an X-oscillation signal with a modulation frequency fx, while a Y-oscillation frequency generator 131 multiplies the frequency f of the base signal by a value y to produce an Y-oscillation signal with a modulation frequency fy.

The X-oscillation signal is fed to the wave generator 121, in order to set the frequency of the wave signal for the X-oscillator unit 117 to the X-oscillation frequency fx. The Y-oscillation signal is similarly provided to the wave generator 123, to set the frequency of the wave signal for the Y-oscillator unit 119 to the Y-oscillation frequency fy. Thus, the X-oscillation unit 117 oscillates at the X-oscillation frequency fx generated by the X-oscillation frequency generator 129, while the Y-oscillator unit 119 oscillates at the Y-oscillation frequency fy generated by the Y-oscillation frequency generator 131. It should be noted, however, that with alternate embodiments of the invention, the modulation signals from the frequency generators 129 and 131 may be sufficiently powerful to drive the oscillator units 117 and 119 directly. These embodiments may thus omit the wave generators 121 and 123.

The X-oscillation signal, the Y-oscillation signal and the modulation signal are also provided to the synchronization control unit 133. As will be discussed in detail below, the synchronization control unit 133 synchronizes image data provided from the image data input unit 109 with the X-oscillation signal and the modulation signal, to ensure that the image data for each pixel position in a scanned line is used to modulate the projection of the corresponding pixel by the light projector unit 103. Similarly, the synchronization control unit 133 synchronizes image data provided from the image data input unit 109 with the Y-oscillation signal to ensure that the image data for each pixel position in a displayed screen is used to modulate the projection of the corresponding pixel by the light projector unit 103.

Determination of the Oscillation and the Modulation Frequencies

To determine the X-oscillation frequency, the Y-oscillation frequency and the modulation frequency, the refresh frequency may first be established. As will be appreciated by those of ordinary skill in the art, the human eye can detect flicker if the refresh rate of a displayed image is lower than 30 Hz. Accordingly, with various embodiments of the invention both the X-direction frequency and the Y-oscillation frequency will typically be higher than 30 Hz. In the illustrated embodiment, the projected light scans in lines parallel to the X-direction, and refresh of the raster scan pattern occurs by oscillation of the projected light in the Y-direction. The Y-oscillation frequency is thus set to approximately 80 Hz in the illustrated embodiment, to ensure that there is no flicker, particularly when the projection display 101 is employed in a handheld device and the user's hand quivers. Of course, with alternate embodiments of invention, the Y-oscillation frequency can be higher or lower than 80 Hz. Further, the Y-oscillation frequency may even be lower than 30 Hz, if the corresponding amount of flicker is acceptable for the intended use of the projection display 101.

In the illustrated embodiment, the projected light is oscillated by oscillating the optical fiber 115A of the light transmission device 115, as previously noted. Therefore, in order to determine the oscillation frequency for oscillating the projected light in the raster scanning direction, the oscillation frequency must be determined for the optical fiber 115A. With various embodiments of the invention, the optical fiber 115A is oscillated at a harmonic frequency, to reduce energy consumption and provide for consistent oscillation.

As known by those of ordinary skill in the art, the harmonic oscillation frequency for the $1^{st}$ order mode oscillation, the $2^{nd}$ order mode oscillation and higher order modes of oscillation of the optical fiber 115A in the rater scanning direction is related to the length of the optical fiber 115A. More particularly, the relationship of the $1^{st}$ order mode and the $2^{nd}$ order mode harmonic oscillation frequencies to the length of the optical fiber 115A for oscillating the optical fiber 115A in the raster scanning direction is $$o \propto 1/l^2$$

where o is the harmonic oscillation frequency and l is the length of the optical fiber 115A during oscillation. That is, the length l is not the length of the optical fiber 115A before the oscillation begins. Instead, the length of the optical fiber 115A will stretch as the optical fiber 115A oscillates. Accordingly, the length l corresponds to the length of the optical fiber 115A during oscillation, after it has stretched to its full length. Accordingly, the X-direction oscillation frequency at a harmonic mode can be determined from a given length of the optical fiber 115A. Alternately, the length of the optical fiber 115A can be determined to match a desired X-direction harmonic oscillation frequency for a desired harmonic mode.

It should be noted that, while the optical fiber 115A can be oscillated in any harmonic mode, the length of the optical fiber 115 together with harmonic mode of oscillation determines the range of movement of the optical fiber 115A. This range of motion in turn determines the field of projection for the projection display 101. Referring to FIGS. 2A and 2B, for example, FIG. 2 illustrates the movement of an exemplary optical fiber 115A oscillating the $1^{st}$ order mode, while FIG. 2B illustrates the movement of that exemplary optical fiber 115A oscillating the $2^{nd}$ order mode. Thus, although the optical fiber 115A can oscillate in either the $1^{st}$ order mode or the $2^{nd}$ order mode (and even higher order modes), depending upon the length of the optical fiber 115A and the oscillation frequency, oscillating the optical fiber 115A in the $2^{nd}$ order mode may provide a wider field of projection than oscillating the optical fiber in the $1^{st}$ order mode, and vice versa. As will be appreciated by those of ordinary skill in the art, the harmonic frequency for an optical fiber in the $2^{nd}$ order mode is approximately six times that of the harmonic frequency in the $1^{st}$ order mode. Accordingly, for a given frequency, the length of the optical fiber l should be much shorter for oscillation in the $1^{st}$ order mode than the length l for oscillation in the $2^{nd}$ order mode.

In the illustrated embodiment, the optical fiber 115A is oscillated in the $2^{nd}$ order mode, in order to obtain a wider field of projection at an X-direction oscillation frequency of approximately 4.5 KHz to 5 KHz. Accordingly, the length l of the optical fiber 115A is approximately 12 mm. With alternate embodiments of the invention, however, the optical fiber 115A may be oscillated in the $1^{st}$ order mode. With these embodiments, the length of the optical fiber 115A will be approximately 4 mm. Of course, both higher and lower harmonic frequencies and other optical fiber lengths may be employed by alternate embodiments of the invention.

Different scanning frequencies may alternately or additionally be employed by other embodiments of the invention. As will be appreciated by those of ordinary skill in the art, a higher scanning direction oscillation frequency will increase the resolution of the projection display, while a lower scanning direction oscillation frequency will decrease the resolution of the projection display. For example, FIG. 3A illustrates the raster scanning pattern projected by the display 101 when the scanning direction oscillation frequency is only four times the refresh direction oscillation frequency, while FIG. 3B illustrates the rater scanning pattern projected by the display 101 when the scanning direction oscillation frequency is 150 times the reference direction oscillation frequency. As can be seen from these figures, the rater scanning pattern shown in FIG. 3B covers much more projection then area than the raster scanning pattern illustrated in FIG. 3A.

The Image Data Input Unit

Referring back now to FIG. 1, the image data will be projected by the projection display 101 originates in the text buffer 137 and the graph buffer 139. More particularly, text information to be displayed by the projection display 101 is stored in the text buffer 137. Other types of image information, such as drawings, are stored in the graph buffer 139. The text information stored in the text buffer 137 may be in any conventional form, such as ASCII encoded data.

The text buffer 137 provides the text data to the translation unit 141. The translation unit 141 then determines the font for the text data, and obtains the corresponding font maps for the text data from the font library 141. Using this information, the translation unit 141 generates binary pixel data corresponding to the text data. More particularly, as shown in FIGS. 4A and 4B, the pixel map for the letter "A" in a specified font can be converted into rows of binary image data. Each row of pixels in the pixel map 401 is converted into a line 403 of binary image data, with each "empty" or "white" bit corresponding to the binary number "0" in the corresponding line 403 of image data, for example, and each "solid" or "dark" pixel corresponding to the binary number "1" in the corresponding line 403 of image data. Similarly, the image information stored and the graph buffer 139 is provided to the translation unit 141 and converted to lines of binary image data. It should be noted, however, that while the illustrated example of the invention employs only a single bit to indicate the value of a pixel of text data or image information, alternate embodiments of the invention may employ any number of bits to indicate the value of a pixel. Thus, the projection display 101 can project images in shades of gray or even color, as will be discussed below.

The translated image data is stored in the display buffer 145, which is held until it can be used to control the modulation signal from the modulation unit 135. As previously noted, the modulation signal from the modulation unit 135 drives the laser diode 113. Moreover, the frequency fm of the modulation signal determines the number of pixels that can be projected along a single scanning line. For example, if each cycle of the modulation signal corresponds to the projection of a pixel in a scanning line, the total number of pixels in a single line will be one-half of the scanning line direction oscillation frequency (which, in the illustrated embodiment, is the X-oscillation frequency fx) divided by the modulation frequency fm. The value of each portion of the modulation signal corresponding to a pixel is then multiplied by the value for a corresponding pixel from the image data. As previously noted, the synchronization control unit 133 synchronizes the image data provided by the display buffer 145 with the modulation signal and the X-oscillation signal, so that the first pixel in a row image data corresponds to the projection of the first pixel by the light projector unit 103. Similarly, the SYNCHRONIZATION control unit 133 synchronizes the image data provided by the display buffer 145 with the the Y-oscillation signal, so that the first pixel in a single display screen of image data corresponds to the projection of the first pixel of a display screen by the light projector unit 103. In this manner, the image data from the display buffer 145 is projected as the raster display 147 onto an incident surface.

A Pen Projection Display

As will be appreciated from the foregoing description of a pen projection display 101 according to the invention, such a projection display 101 can be made a very small. For example, a pen projection display 101 as described above can be manufactured at a sufficiently small size to be implemented in a hand-held device, such as a writing device.

Referring now to FIG. 5, this figure illustrates how various components of the rejection display according to the illustrated embodiment can be provided in a projection display body 501 of the same approximate size and shape as an ink pen, graphic tablet stylus, or pencil. Moreover, in addition to the projection display 101, the projection display body 501 may even include a writing instrument 503. The writing instrument 503 may be, for example, an ink pen, a graphic tablet stylus tip, or a pencil.

By providing a projection display 101 with a writing instrument 503, the projection display 101 can be conveniently carried by a user in almost all conditions. In order to view image data stored in the display offer 145, the user need simply to place the projection display body 501 at an appropriate distance from an incident surface, and activate the projection display 101. Thus, the projection display 101 according to the invention can be employed with a computer without requiring that the computer provide a large display screen.

With a handheld projection display 101 according to various embodiments of the invention, such as those described above, the display of information projected by the display 101 may be manually controlled by the user. For example, the projection display 101 may include one or more control buttons for selecting the image data to be displayed by the projection display 101. Thus, with some embodiments of the invention, the user may scroll forward and backward through pages of displayed information using a command button. Alternately, various embodiments of the invention may automatically display information based upon the position of the display 101. For example, the display 101 may project sequential screens of information as the display 101 is moved over an incident surface. Alternately, or additionally, the display 101 may display information corresponding to a particular location, such as a word printed on the incident surface, when the display 101 is positioned at that location. For these embodiments of the invention, the display 101 may determine its position using, for example, a gyroscopic position detection device. Alternately, the display 101 may determine its position using position-indicating markings on the incident surface.

Direct Oscillation of the Light Source

Figure 6:
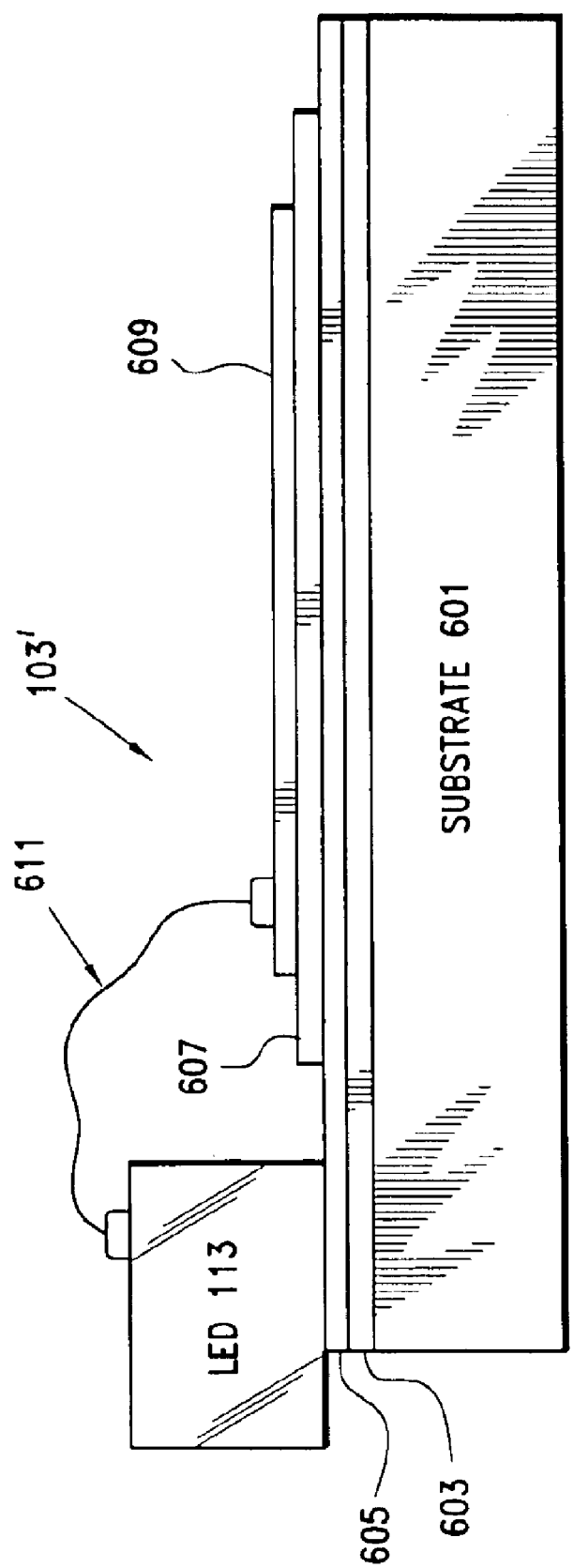
FIG. 6 illustrates a light projector unit according to another embodiment of the invention.

As noted above, various embodiments of the invention may directly oscillate the light source 113 itself or the entire light projection unit 103. A light projector unit 103' employed by one such embodiment is illustrated in FIG. 6. As seen in this figure, the light projector unit 103' includes a light emitting diode serving as the light source 113. The light source 113 is mounted on a substrate 601. With the illustrated embodiment, the substrate 601 is formed of GaAs. With alternate embodiments of the invention, however, the substrate 601 may be any type of substrate having a suitable flexibility for oscillation in the desired direction.

More particularly, a non-conductive isolation layer 603 is formed on the substrate 601, and a first electrode 605 is then formed over the isolation layer 603. Thus, the isolation layer 603 electrically isolates the first electrode 605 from the substrate 601. The light source 113 is then mounted on the first electrode 605, so as to form an electrical connection between an control electrode of the light source 113 and the electrode 603. A second non-conductive isolation layer 607 is then formed over a portion of the first electrode 603, and a second electrode 609 is formed over a portion of the second isolation layer 607. Thus, the second isolation layer 607 electrically isolates the second electrode 609 from the first electrode 603. As seen in FIG. 6, a second control electrode of the light source 113 is then electrically connected to the second electrode 609 through a wire connection 611.

The light source 113 thus can receive modulation signals for controlling the operation of the light source 113 through the first electrode 605 and the second electrode 609. Moreover, because the electrodes 605 and 609 and the isolation layers 603 and 607 are relatively thin, they will not prevent the substrate 601 from flexing. Accordingly, oscillators, such as the oscillators 117 and 119 described above, can be employed to oscillate the substrate 601 and thus the light source 113.

As will be previously described embodiments employing the optical fiber 115A, embodiments of the invention which direction oscillate the light source 113 or the light projector unit 103 may be made sufficiently small to be incorporated into a portable or handheld projection display 101. For example, with the embodiment of the light projector unit 103 illustrated in FIG. 6, the substrate 601 may be implemented with a length of 15 mm, a width of 200 µm, and a height of 150 µm. With this implementation, a laser diode can be employed as the light source 113 with a length of 300 µm, a width of 300 µm, and a height of 100 µm.

Conclusion

Although various embodiments of the invention have been described above, these embodiments are exemplary in that the invention may include the elements and steps described herein in any combination or sub combination. Accordingly, there are any number of alternative combinations for defining the invention, which incorporates one or more elements from the specification, including the description, claims, and drawings, in various combinations or sub combinations.

For example, while the illustrated embodiments of the projection display 101 described above project images in one color, alternate embodiments of the invention may project images in multiple colors. The projection display 101 may, e.g., employ three separate light projector units 103, each of a complementary primary color such as red, green, and blue. The optical fibers 115A of each light projector unit 103 can then be oscillated together as a single unit. Thus, each optical fiber 115A would simultaneously project its color onto a single pixel. By modulating the operation of each of the light projector units 103 based upon corresponding color image data, the combination of light projector units 103 could project colored pixels and thus colored images. Moreover, a single oscillator 105 could be employed to simultaneously oscillate the light of projected from each of the light projector units 103. Still further, for handheld embodiments, the projection display 101 may include one or more anti-shaking devices, such as an X-direction and Y-direction deflection value controller to keep the projected image steady at a single location.

It will be apparent to those skilled in the relevant technology, in light of the present specification, that further alternate combinations of aspects of the invention, either alone or in combination with one or more features or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A projection display, comprising
 a light projector, the light projector including
  a light source; and
  a light transmission device having an optical fiber with a length of approximately 4 millimeters or 12 millimeters;
 a modulator for modulating light projected from the light projector; and
 an oscillator for oscillating light projected from the light projector in multiple directions, wherein the oscillator moves the light projector in a first direction and a second direction orthogonal to the first direction.

2. The projection display recited in claim 1, wherein the light source is a laser diode.

3. The projection display recited in claim 1, wherein the light source is selected from the group consisting of a laser, a light emitting diode, an incandescent light, and a fluorescent light.

4. The projection display recited in claim 1, wherein the oscillator includes
 a first oscillating unit for oscillating the light projector in an X-direction, and
 a second oscillating unit for oscillating the light projector in a Y-direction.

5. The projection display recited in claim 4, wherein the second oscillating unit oscillates the light projector at a frequency of approximately 80 Hz.

6. The projection display recited in claim 4, wherein the first and second oscillating units include piezoelectric oscillators.

7. The projection display recited in claim 4, wherein the first oscillating unit oscillates the light projector at a frequency of approximately 4.5 kHz to 5 kHz.

8. The projection display recited in claim 7, wherein the second oscillating unit oscillates the light projector at a frequency of approximately 80 Hz.

9. The projection display recited in claim 1, wherein the oscillator includes
 a rotation device that rotates the light projector about an axis, and
 an oscillating unit for oscillating the light projector to and away from the axis.

10. The projection display recited in claim 1, wherein the modulator modulates creation of light by the light projector.

11. The projection display recited in claim 1, wherein the modulator modulates transmission of light by the light projector.

12. The projection display recited in claim 1, further comprising a writing instrument positioned proximal to the light projector.

13. The projection display recited in claim 12, wherein the writing instrument is an ink pen or a stylus for activating a graphic tablet.

14. A pen projection display comprising,
a light projector;
a modulator for modulating light projected from the light projector; and
an oscillator for oscillating light projected from the light projector in multiple directions,
the oscillator moves the light projector in a first direction and a second direction orthogonal to the first direction,
the oscillator including a first oscillating unit for oscillating the light projector in an X-direction, the first oscillating unit oscillates the light projector at a frequency of approximately 4.5 kHz to 5 kHz, and a second oscillating unit for oscillating the light projector in a Y-direction.

15. The projection display recited in claim 14, wherein the second oscillating unit oscillates the light projector at a frequency of approximately 80 Hz.

16. The projection display recited in claim 14, wherein the light projector includes:
a light source; and
a light transmission device.

17. The projection display recited in claim 16, wherein the light transmission device includes an optical fiber.

18. The projection display recited in claim 17, wherein the optical fiber has length of approximately 4 millimeters or 12 millimeters.

19. The projection display recited in claim 16, wherein the light source is a laser diode.

20. The projection display recited in claim 16, wherein the light source is selected form the group consisting of a laser, a light emitting diode, an incandescent light, and a fluorescent light.

21. The projection display recited in claim 14, wherein the first and second oscillating units include piezoelectric oscillators.

22. The projection display recited in claim 14, wherein the modulator modulates creation of light by the light projector.

23. The projection display recited in claim 14, wherein the modulator modulates transmission of light by the light projector.

24. The projection display recited in claim 14, further comprising a writing instrument positioned proximal to the light projector.

25. The projection display recited in claim 24, wherein the writing instrument is an ink pen or a stylus for activating a graphic tablet.

26. A pen projection display, comprising:
a light projector;
a modulator for modulating light projected from the light projector; and
an oscillator for oscillating light projected from the light projector in multiple directions, wherein the oscillator moves the light projector in a first direction and a second direction orthogonal to the first direction, the oscillator including
a rotation device that rotates the light projector about an axis, and
an oscillating unit for oscillating the light projector to and away from the axis.

27. The projection display recited in claim 26, wherein the modulator modulates creation of light by the light projector.

28. The projection display recited in claim 26, wherein the modulator modulates transmission of light by the light projector.

29. The projection display recited in claim 26, wherein the light projector includes:
a light source; and
a light transmission device.

30. The projection display recited in claim 29, wherein the light transmission device includes an optical fiber.

31. The projection display recited in claim 29, wherein the light source is a laser diode.

32. The projection display recited in claim 29, wherein the light source is selected from the group consisting of a laser, a light emitting diode, an incandescent light, and a fluorescent light.

33. The projection display recited in claim 26, wherein the oscillating unit includes a piezoelectric oscillator.

34. The projection display recited in claim 26, further comprising a writing instrument positioned proximal to the light projector.

35. The projection display recited in claim 34, wherein the writing instrument is an ink pen or a stylus for activating a graphic tablet.

36. A projector display comprising
a light projector;
a modulator for modulating light projected from the light projector;
an oscillator for oscillating light projected from the light projector in multiple directions, wherein the oscillator moves the light projector in a first direction and a second direction orthogonal to the first direction; and
a writing instrument positioned proximal to the light projector.

37. The projection display recited in claim 36, wherein the writing instrument is an ink pen or a stylus for activating a graphic sheet.

38. The projection display recited in claim 36, wherein the light projector includes:
a light source; and
a light transmission device.

39. The projection display recited in claim 38, wherein the light transmission device includes an optical fiber.

40. The projection display recited in claim 38, wherein the light source is a laser diode.

41. The projection display recited in claim 38, wherein the light source is selected from the group consisting of a laser, a light emitting diode, an incandescent light, and a fluorescent light.

42. The projection display recited in claim 36, wherein the oscillator includes
a first oscillating unit for oscillating the light projector in an X-direction, and
a second oscillating unit for oscillating the light projector in a Y-direction.

43. The projection display recited in claim 42, wherein the first oscillating unit oscillates the light projector at a frequency of approximately 4.5 kHz to 5 kHz.

44. The projection display recited in claim 43, wherein the second oscillating unit oscillates the light projector at a frequency of approximately 80 Hz.

45. The projection display recited in claim 42, wherein the second oscillating unit oscillates the light projector at a frequency of approximately 80 Hz.

46. The projection display recited in claim 42, wherein the first and second oscillating units include piezoelectric oscillators.

47. The projection display recited in claim 36, wherein the oscillator includes
 a rotation device that rotates the light projector about an axis, and
 an oscillating unit for oscillating the light projector to and away from the axis.

48. The projection display recited in claim 36, wherein the modulator modulates creation of light by the light projector.

49. The projection display recited in claim 36, wherein the modulator modulates transmission of light by the light projector.

50. A projection display, comprising:
 a light projector, the light projector including a light source and a light transmission device;
 a modulator for modulating light projected from the light projector; and
 an oscillator for oscillating light projected from the light projector in multiple directions, wherein the oscillator includes a first oscillating unit for oscillating the light projector in an X-direction, and a second oscillating unit for oscillating the light projector in a Y-direction, and
 moves the light projector in a first direction and a second direction orthogonal to the first direction; and
 a writing instrument positioned proximal to the light projector.

51. The projection display recited in claim 50, wherein:
 the light transmission device is an optical fiber having a length of approximately 4 millimeters or 12 millimeters,
 the first oscillating unit oscillates the light projector at a frequency of 4.5 kHz to 5 kHz, and,
 the second oscillating unit oscillates the light projector at a frequency of approximately 80 Hz.

52. The projection display recited in claim 50, wherein the light source is a laser diode.

53. The projection display recited in claim 50, wherein the light source is selected from the group consisting of a laser, a light emitting diode, an incandescent light, and a fluorescent light.

54. The projection display recited in claim 50, wherein the first and second oscillating units include piezoelectric oscillators.

55. The projection display recited in claim 50, wherein the modulator modulates creation of light by the light projector.

56. The projection display recited in claim 50, wherein the modulator modulates transmission of light by the light projector.

57. The projection display recited in claim 50, wherein the writing instrument is an ink pen or a stylus for activating a graphic tablet.

58. A projection display, comprising:
 a first light projector for projecting light of a first color, the first light projector including
  a first light source, and
  a first light transmission device, the first light transmission device including a first optical fiber having a length of approximately 4 millimeters or 12 millimeters;
 a first modulator for modulating light projected from the first light projector;
 a second light projector for projecting light of a second color, the second light projector including
  a second light source, and
  a second light transmission device, the second light transmission device including a second optical fiber having a length of approximately 4 millimeters or 12 millimeters;
 a second modulator for modulating the light projected from the second light projector; and
 at least one oscillator for moving the light projected from the first light projector and the second light projector in a first direction and a second direction orthogonal to the first direction.

59. The projection display recited in claim 58, wherein the first light source and the second light source are selected from the group consisting of a laser, a light emitting diode, an incandescent light, and a fluorescent light.

60. The projection display recited in claim 58, wherein the at least one oscillator includes
 a first oscillating unit for oscillating both the first light projector and the second light projector in an X-direction, and
 a second oscillating unit for oscillating both the first light projector and the second light projector in a Y-direction.

61. The projection display recited in claim 58, wherein the at least one oscillator includes
 a first oscillator that moves the light projected from the first light projector in multiple directions, and
 a second oscillator that moves the light projected from the second light projector in multiple directions.

62. The projection display recited in claim 58, wherein the at least one oscillator includes
 a rotation device that rotates the first light projector and the second light projector about an axis, and
 an oscillating unit for oscillating the both the first light projector and the second light projector to and away from the axis.

63. The projection display recited in claim 61, wherein the first oscillator includes
 a first oscillating unit for oscillating the first light projector in an X-direction, and
 a second oscillating unit for oscillating the first light projector in a Y-direction; and the second oscillator includes
 a third oscillating unit for oscillating the second light projector in an X-direction, and
 a fourth oscillating unit for oscillating the second light projector in a Y-direction.

64. The projection display recited in claim 61, wherein the first oscillator includes
 a first rotation device that rotates the first light projector about a first axis, and
 a first oscillating unit for oscillating the first light projector to and away from the first axis; and
 the second oscillator includes
 a second rotation device that rotates the second light projector about a second axis, and
 a second oscillating unit for oscillating the second light projector to and away from the second axis.

65. The projection display recited in claim 58, further comprising a writing instrument positioned proximal to both the first light projector and the second light projector.

66. The projection display recited in claim 65, wherein the writing instrument is an ink pen or a stylus for activating a graphic tablet.

67. A projection display, comprising:
 a first light projector for projecting light of a first color;
 a first modulator for modulating light projected from the first light projector;
 a second light projector for projecting light of a second color;

a second modulator for modulating light projected from the second light projector; and at least one oscillator for moving the light projected from the first light projector and the second light projector in a first direction and a second direction orthogonal to the first direction, the at least one oscillator including
 a rotation device that rotates the first light projector and the second light projector about an axis, and
 an oscillating unit for oscillating the both the first light projector and the second light projector to and away from the axis.

68. The projection display recited in claim 19, wherein the first light projector includes:
 a first light source, and
 a first light transmission device; and
the second light projector includes
 a second light source, and
 a second light transmission device.

69. The projection display recited in claim 68, wherein the first light transmission device includes a first optical fiber and the second light transmission device includes a second optical fiber.

70. The projection display recited in claim 69, wherein both the first optical fiber and the second optical fiber have a length of approximately 4 millimeters or 12 millimeters.

71. The projection display recited in claim 68, wherein the first light source and the second light source are selected from the group consisting of a laser, a light emitting diode, an incandescent light, and a fluorescent light.

72. The projection display recited in claim 67, further comprising a writing instrument positioned proximal to both the first light projector and the second light projector.

73. The projection display recited in claim 72, wherein the writing instrument is an ink pen or a stylus for activating a graphic tablet.

74. A projection display, comprising:
 a first light projector for projecting light of a first color;
 a first modulator for modulating light projected from the first light projector;
 a second light projector for projecting light of a second color;
 a second modulator for modulating light projected from the second light projector; and
 at least one oscillator for moving the light projected from the first light projector and the second light projector in a first direction and a second direction orthogonal to the first direction, the at least one oscillator including
  a first oscillator that moves the light projected from the first light projector in multiple directions, the first oscillator having
   a first oscillating unit for oscillating the first light projector in an X-direction, and
   a second oscillating unit for oscillating the first light projector in a Y-direction; and
  a second oscillator that moves the light projected from the second light projector in multiple directions, the second oscillator having
   a third oscillating unit for oscillating the second light projector in an X-direction, and
   a fourth oscillating unit for oscillating the second light projector in a Y-direction.

75. The projection display recited in claim 74, wherein the first light projector includes:
 a first light source; and
 a first light transmission device; and
the second light projector includes
 a second light source, and
 a second light transmission device.

76. The projection display recited in claim 75, wherein the first light transmission device includes a first optical fiber and the second light transmission device includes a second optical fiber.

77. The projection display recited in claim 76, wherein both the first optical fiber and the second optical fiber have a length of approximately 4 millimeters or 12 millimeters.

78. The projection display recited in claim 75, wherein the first light source and the second light source are selected from the group consisting of a laser, a light emitting diode, an incandescent light, and a fluorescent light.

79. The projection display recited in claim 74, further comprising a writing instrument positioned proximal to both the first light projector and the second light projector.

80. The projection display recited in claim 79, wherein the writing instrument is an ink pen or a stylus for activating a graphic tablet.

81. The projection display recited in claim 74, further comprising a writing instrument positioned proximal to both the first light projector and the second light projector.

82. The projection display recited in claim 81, wherein the writing instrument is an ink pen or a stylus for activating a graphic tablet.

83. A projection display comprising,
 a first light projector for projecting light of a first color;
 a first modulator for modulating light projected from the first light projector;
 a second light projector for projecting light of a second color;
 a second modulator for modulating light projected from the second light projector; and
 at least one oscillator for moving the light projected from the first light projector and the second light projector in a first direction and a second direction orthogonal to the first direction, the at least one oscillator including
  a first oscillator that moves the light projected from the first light projector in multiple directions, first oscillator having
   a first rotation device that rotates the first light projector about a first axis, and
   a first oscillating unit for oscillating the first light projector to and away from the first axis; and
  a second oscillator that moves the light projected from the second light projector in multiple directions, the second oscillator having
   a second rotation device that rotates the second light projector about a second axis, and
   a second oscillating unit for oscillating the second light projector to and away from the second axis.

84. The projection display recited in claim 83, wherein the first light projector includes:
 a first light source, and
 a first light transmission device; and
the second light projector includes
 a second light source, and
 a second light transmission device.

85. The projection display recited in claim 84, wherein the first light transmission device includes a first optical fiber and the second light transmission device includes a second optical fiber.

86. The projection display recited in claim 85, wherein both the first optical fiber and the second optical fiber have a length of approximately 4 millimeters or 12 millimeters.

87. The projection display recited in claim 84, wherein the first light source and the second light source are selected from the group consisting of a laser, a light emitting diode, a incandescent light, and a fluorescent light.

88. A projection display, comprising
a first light projector for projecting light of a first color;
a first modulator for modulating light projected from the first light projector;
a second light projector for projecting light of a second color;
a second modulator for modulating light projected from the second light projector; and
at least one oscillator for moving the light projected from the first light projector and the second light projector in a first direction and a second direction orthogonal to the first direction; and
a writing instrument positioned proximal to both the first light projector and the second light projector.

89. The projection display recited in claim 88, wherein the writing instrument is an ink pen or a stylus for activating a graphic tablet.

90. The projection display recited in claim 88, wherein the first light projector includes:
a first light source, and
a first light transmission device; and
the second light projector includes
a second light source, and
a second light transmission device.

91. The projection display recited in claim 90, wherein the first light transmission device includes a first optical fiber and the second light transmission device includes a second optical fiber.

92. The projection display recited in claim 90, wherein the first light source and the second light source are selected from the group consisting of a laser, a light emitting diode, an incandescent light, and a fluorescent light.

93. The projection display recited in claim 88, wherein the at least one oscillator moves the light projected from the first light projector and the light projected from the second light projector in multiple directions.

94. The projection display recited in claim 93, wherein the at least one oscillator moves both the first light projector and the second light projector in a first direction and a second direction orthogonal to the first direction.

95. The projection display recited in claim 88, wherein the at least one oscillator includes
a first oscillating unit for oscillating both the first light projector and the second light projector in an X-direction, and
a second oscillating unit for oscillating both the first light projector and the second light projector in a Y-direction.

96. The projection display recited in claim 88, wherein the at least one oscillator includes
a first oscillator that moves the light projected from the first light projector in multiple directions, and
a second oscillator that moves the light projected from the second light projector in multiple directions.

97. The projection display recited in claim 96, wherein the first oscillator includes
a first oscillating unit for oscillating the first light projector in an X-direction, and
a second oscillating unit for oscillating the first light projector in a Y-direction; and
the second oscillator includes
a third oscillating unit for oscillating the second light projector in an X-direction, and
a fourth oscillating unit for oscillating the second light projector in a Y-direction.

98. The projection display recited in claim 88, wherein the first oscillator includes
a first rotation device that rotates the first light projector about a first axis, and
a first oscillating unit for oscillating the first light projector to and away from the first axis; and
the second oscillator includes
a second rotation device that rotates the second light projector about a second axis, and
a second oscillating unit for oscillating the second light projector to and away from the second axis.

99. A method of projecting an image, comprising:
projecting light from a light projector;
moving the projected light projected from the light projector by rotating the light projector about an axis while oscillating the light projector toward and away from the axis; and
modulating the projected light in synchronism with the movement of the light projector.

100. The method of projecting an image recited in claim 99, wherein modulating the projected light further comprises modulating generation of light by the light projector.

101. The method of projecting an image recited in claim 99, wherein modulating the projected light further comprises modulating transmission of light by the light projector.

102. A projection display, comprising:
a first light projector for projecting light of a first color, the first light projector including a first light source and a first light transmission device;
a first modulator for modulating light projection from the first light projector;
a second light projector for projecting light of a second color, the second light projector including a second light source and a second light transmission device;
a second modulator for modulating light projected from the second light projector; and
a first oscillator that moves the light projected from the first light projector in multiple directions, the first oscillator including
a first oscillating unit for oscillating the first light projector in an X-direction, and
a second oscillating unit for oscillating the first light projector in a Y-direction; and
a second oscillator that moves the light projected from the second light projector in multiple directions, the second oscillator including
a third oscillating unit for oscillating the second light projector in an X-direction, and
a fourth oscillating unit for oscillating the second light projector in a Y-direction.

103. The projection display recited in claim 102, wherein the first light transmission device includes a first optical fiber and the second light transmission device includes a second optical fiber.

104. The projection display recited in claim 103, wherein both the first optical fiber and the second optical fiber have a length of approximately 4 millimeters or 12 millimeters.

105. The projection display recited in claim 102, wherein the first light source and the second light source are selected from the group consisting of a laser, a light emitting diode, an incandescent light, and a fluorescent light.

106. The projection display recited in claim 102, further comprising a writing instrument positioned proximal to both the first light projector and the second light projector.

107. The projection display recited in claim 106, wherein the writing instrument is an ink pen or a stylus for activating a graphic tablet.

108. A projection display, comprising:
- a first light projector for projecting light of a first color, the first light projector including a first light source and a first light transmission device;
- a first modulator for modulating light projected from the first light projector;
- a second light projector for projecting light of a second color, the second light projector including a second light source and a second light transmission device;
- a second modulator for modulating light projected from the second light projector; and
- a first oscillator that moves the light projected from the first light projector in multiple directions, the first oscillator including
  - a first rotation device that rotates the first light projector about a first axis, and
  - a first oscillating unit for oscillating the first light projector to and away from the first axis; and
- a second oscillator that moves the light projected from the second light projector in multiple directions, the second oscillator including
  - a second rotation device that rotates the second light projector about a second axis, and
  - a second oscillating unit for oscillating the second light projector to and away from the second axis.

109. The projection display recited in claim 108, wherein the first light transmission device includes a first optical fiber and the second light transmission device includes a second optical fiber.

110. The projection display recited in claim 109, wherein both the first optical fiber and the second optical fiber have a length of approximately 4 millimeters or 12 millimeters.

111. The projection display recited in claim 108, wherein the first light source and the second light source are selected from the group consisting of a laser, a light emitting diode, an incandescent light, and a fluorescent light.

112. The projection display recited in claim 108, further comprising a writing instrument positioned proximal to both the first light projector and the second light projector.

113. The projection display recited in claim 112, wherein the writing instrument is an ink pen or a stylus for activating a graphic tablet.

\* \* \* \* \*